United States Patent
Kindarji et al.

(10) Patent No.: US 9,515,818 B2
(45) Date of Patent: Dec. 6, 2016

(54) MULTI-BLOCK CRYPTOGRAPHIC OPERATION

(71) Applicant: Apple Inc., Cupertino, CA (US)

(72) Inventors: Bruno Kindarji, Paris (FR); Mathieu Ciet, Paris (FR); Benoit Chevallier-Mames, Paris (FR); Thomas Icart, Paris (FR); Augustin J. Farrugia, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 2 days.

(21) Appl. No.: 14/487,872

(22) Filed: Sep. 16, 2014

(65) Prior Publication Data

US 2016/0080143 A1     Mar. 17, 2016

(51) Int. Cl.
| | | |
|---|---|---|
| H04L 9/00 | (2006.01) | |
| H04L 9/28 | (2006.01) | |
| H04L 9/06 | (2006.01) | |
| H04L 9/08 | (2006.01) | |
| G06F 11/00 | (2006.01) | |
| G06F 12/14 | (2006.01) | |

(52) U.S. Cl.
CPC .......... H04L 9/0618 (2013.01); H04L 9/0816 (2013.01); H04L 2209/24 (2013.01)

(58) Field of Classification Search
None
See application file for complete search history.

(56) References Cited

U.S. PATENT DOCUMENTS

| | | | |
|---|---|---|---|
| 7,392,400 B2 | 6/2008 | Henry et al. | |
| 8,194,854 B2 | 6/2012 | Gueron et al. | |
| 2002/0041685 A1* | 4/2002 | McLoone | H04L 9/0625 380/45 |
| 2002/0051534 A1* | 5/2002 | Matchett | H04L 9/0625 380/37 |
| 2005/0060560 A1* | 3/2005 | Sibert | G06F 21/606 713/193 |
| 2006/0072746 A1* | 4/2006 | Tadepalli | H04L 9/0631 380/37 |
| 2009/0052659 A1* | 2/2009 | Gueron | H04L 9/0631 380/29 |
| 2009/0060197 A1* | 3/2009 | Taylor | H04L 9/0618 380/277 |
| 2009/0080647 A1* | 3/2009 | Mantin | H04L 9/0637 380/29 |
| 2009/0147947 A1 | 6/2009 | Ingimundarson et al. | |
| 2009/0202070 A1* | 8/2009 | Mantin | H04L 9/0618 380/44 |
| 2010/0054461 A1* | 3/2010 | Ciet | H04L 9/002 380/29 |
| 2010/0111298 A1* | 5/2010 | Krig | H04L 9/0637 380/37 |
| 2011/0255689 A1* | 10/2011 | Bolotov | H04L 9/0631 380/42 |
| 2011/0280394 A1* | 11/2011 | Hoover | H04L 9/0618 380/28 |
| 2012/0093313 A1* | 4/2012 | Michiels | H04L 9/002 380/255 |
| 2012/0121083 A1* | 5/2012 | You | H04L 9/0631 380/28 |
| 2012/0155638 A1* | 6/2012 | Farrugia | H04L 9/0631 380/45 |
| 2013/0067212 A1* | 3/2013 | Farrugia | H04L 9/0631 713/150 |
| 2013/0343546 A1* | 12/2013 | Shibutani | H04L 9/0894 380/286 |
| 2014/0192983 A1* | 7/2014 | Hamilton | G06F 21/72 380/259 |

FOREIGN PATENT DOCUMENTS

WO    WO 2010/146140      12/2010

* cited by examiner

*Primary Examiner* — Dede Zecher
*Assistant Examiner* — Trang Doan
(74) *Attorney, Agent, or Firm* — Adeli LLP

(57) ABSTRACT

Some embodiments provide a method for performing a block cryptographic operation that includes a plurality of rounds. The method receives a message that includes several blocks. The method selects a set of the blocks. The set has a particular number of blocks. The method applies a cryptographic operation to the selected set of blocks. A particular round of the cryptographic operation for a first block in the set is performed after a later round than the particular round for a second block in the set, while a different particular round for the first block is performed before an earlier round than the different particular round for the second block. In some embodiments, at least two rounds for the first block are performed one after the other without any intervening rounds for any other blocks in the set.

23 Claims, 11 Drawing Sheets

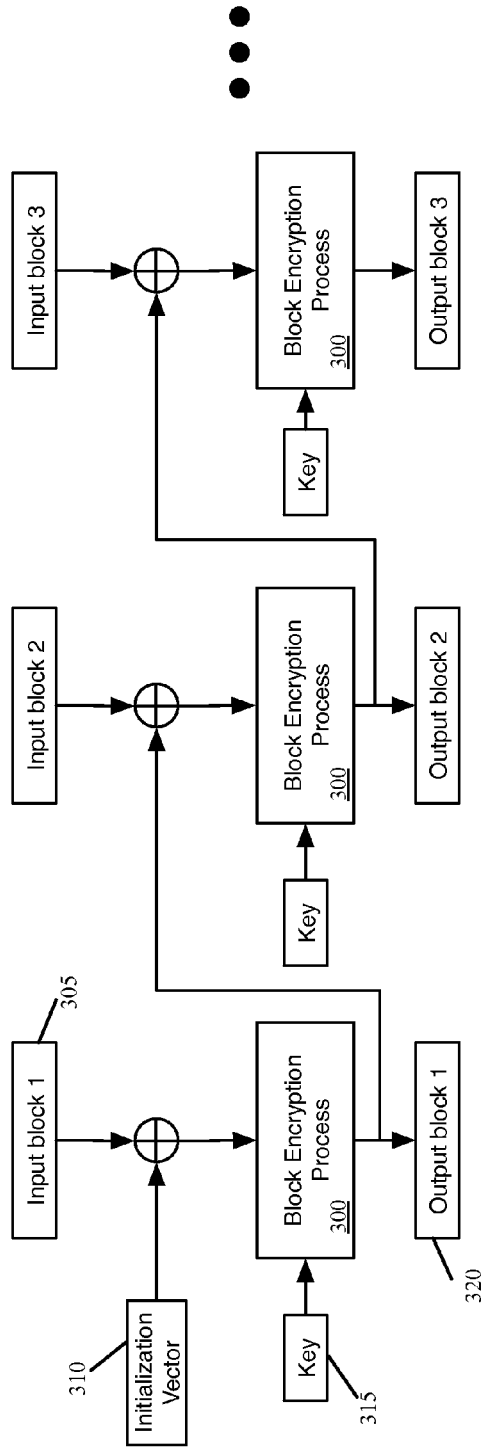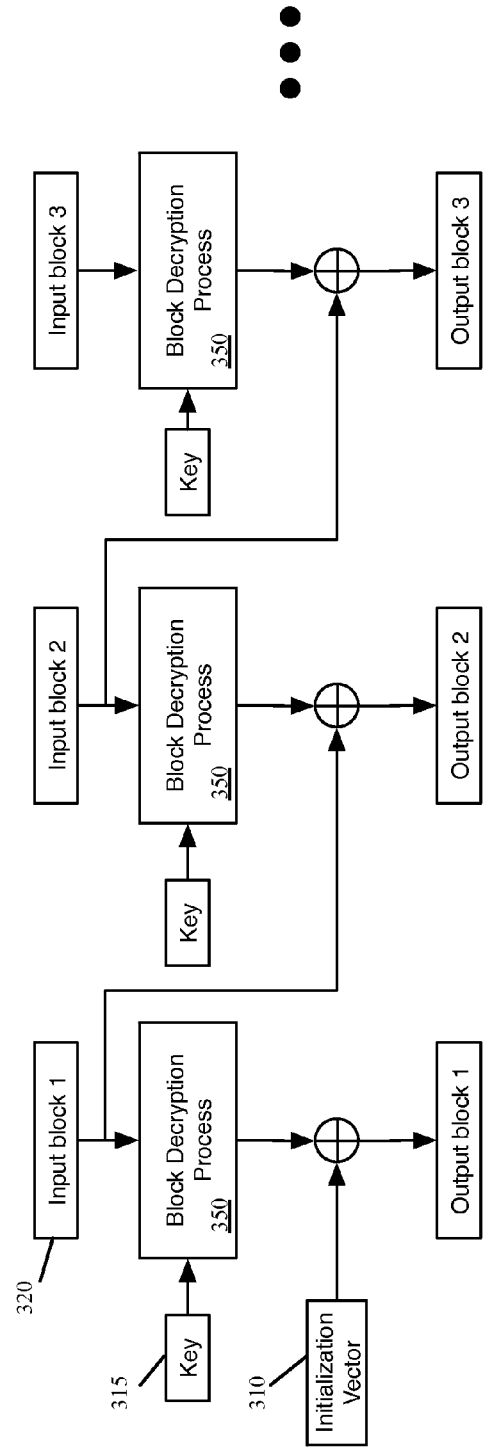
Fig. 3A
Fig. 3B

MULTI-BLOCK CRYPTOGRAPHIC OPERATION

BACKGROUND

Cryptographic algorithms are widely used for encryption of messages, authentication, encryption signatures and identification. The well-known DES (Data Encryption Standard) has been in use for a long time, and was updated by Triple-DES, which has been replaced in many applications by the AES (Advanced Encryption Standard). AES is an approved encryption standard by the U.S. government. AES is a substitution permutation network, that is fast enough to execute in both computer software and hardware implementations, relatively easy to implement, and requires little memory space.

Of note, implementations of AES do not provide much security against an attacker recovering a secret key, if the attacker has privileged access to the system implementing the cipher. However, AES is often used in potentially insecure environments. For instance, AES could be employed in a white box environment. In a white box model, it is presumed that an attacker has total access to the system performing an encryption, including being able to observe directly a state of memory, program execution, and so on. In such a model, an encryption key can be observed in or extracted from memory, and so ways to conceal operations indicative of a secret key are important. For example, the attacker can learn the secret key of an AES software implementation by observing the execution of the key scheduling algorithm.

DRM applications are one instance where it's desired to keep the attacker from finding the secret key even though the attacker has complete control of the execution process. Chow et. al. (Stanley Chow, Philip A. Eisen, Harold Johnson, Paul C. van Oorschot: White-Box Cryptography and an AES Implementation. Selected Areas in Cryptography 2002: 250-270) give a construction of the AES algorithm for such white box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

However, this solution does not solve all the application's needs for block cipher's encryption. Indeed, the case where the key is derived through a given process and then unknown at the compilation time is not included. One typical use-case is when a program is distributed over several users and each of them has their own key. In this case, it is impossible to disseminate different code to each user from a practical point of view. Another use-case is just when generating session keys (different for each session) through a given process. Of course, in this case the key is unknown at compilation time. A last case is when it is necessary to store a plenty of keys. However, it is not reasonable to consider storing around 700 kB for each key.

BRIEF SUMMARY

Some embodiments provide a method for performing a block cryptographic operation (e.g., AES, DES, 3DES, etc.) on multiple blocks at once. That is, rather than applying a cryptographic operation function separately to each block, some embodiments apply a function that performs the cryptographic operation on multiple blocks together.

Different embodiments may apply the cryptographic operation for multiple blocks in different modes of operation (e.g., ECB, CBC, or CTR, among others). When performing decryption of multiple blocks in CBC mode, some embodiments either avoid using in-place decryption or use a buffer that holds the multiple blocks, performs ECB-style decryption, then applies the initialization vectors to the multiple blocks together to generate the output blocks. For CTR encryption or decryption, the similarity of operations (i.e., the use of the same XOR operations and table lookups from one block to the next (at least during the initial rounds) allows for the re-use of the results of such operations across the multiple blocks, without the need to recompute the results.

In addition, for use in a whitebox environment, some embodiments apply various different whitebox techniques to the multi-block cryptographic operation. For instance, some embodiments will use a first whitebox technique (e.g., a mask value, a linear permutation operation, etc.) on a first one of the blocks and a second whitebox technique on a second one of the blocks. In addition, some embodiments modify the protection on the blocks between rounds of the cryptographic operation, possibly linking the blocks together, thereby further obfuscating the data at runtime.

In addition, the source code may be obfuscated in various ways in order to provide further protection against whitebox attackers. For instance, some embodiments mix the different rounds of the cryptographic operation for different blocks. Rather than performing round 1 for all of the multiple blocks, then round 2 for all of the blocks, etc., some embodiments mix up the rounds by, e.g., performing several rounds for one block, then a round or two for another block, etc., so long as all the dependencies between rounds are maintained.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 3A and 3B conceptually illustrate the CBC mode encryption and decryption processes.

DETAILED DESCRIPTION

Figure 1:
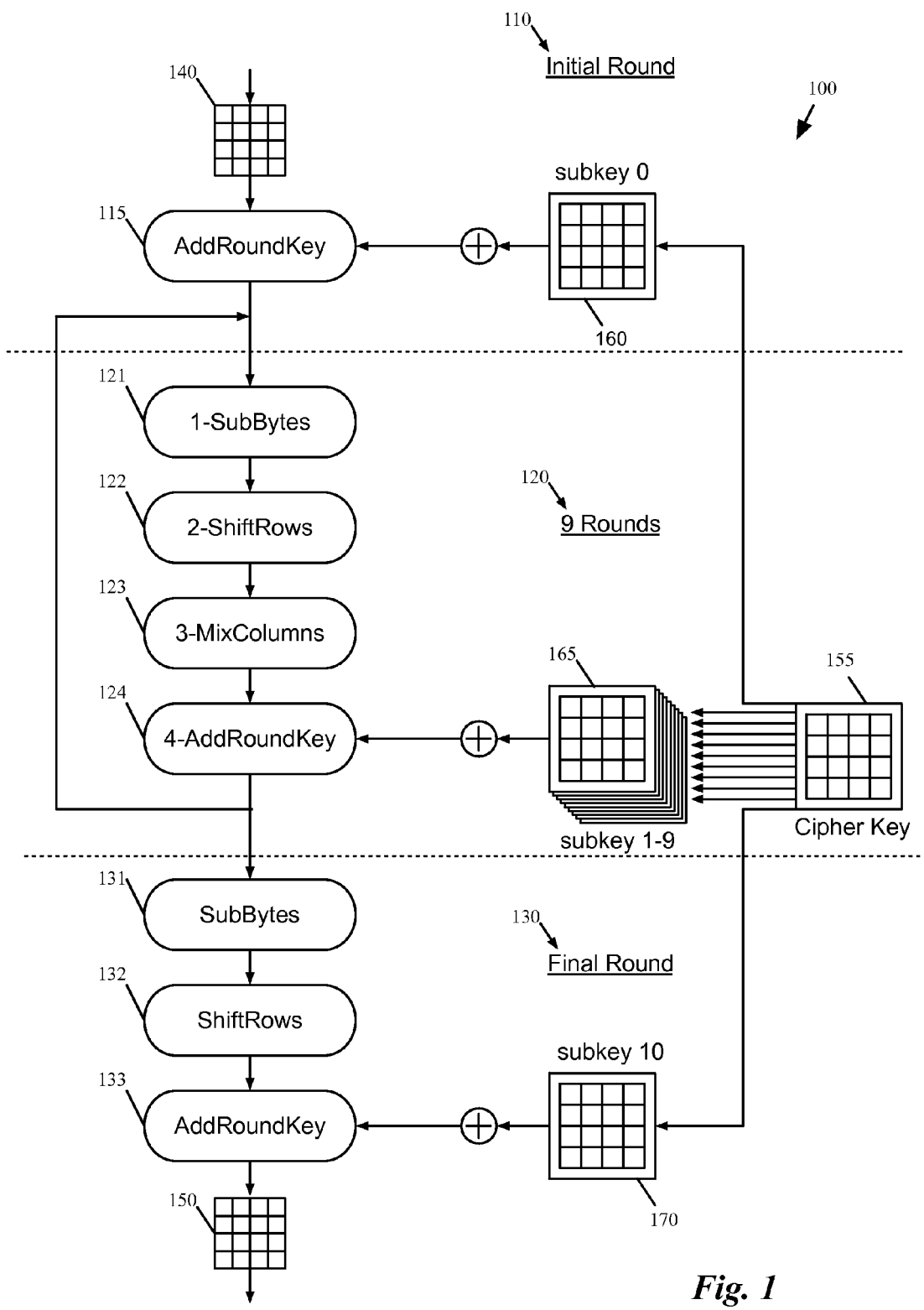
FIG. 1 provides a conceptual illustration of an example cryptographic operation according to the AES standard.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for performing a block cryptographic operation (e.g., AES, DES, 3DES, etc.) on multiple blocks at once. That is, rather than applying a cryptographic operation function separately to each block, some embodiments apply a function that performs the cryptographic operation on multiple blocks together.

Different embodiments may apply the cryptographic operation for multiple blocks in different modes of operation (e.g., ECB, CBC, or CTR, among others). When performing decryption of multiple blocks in CBC mode, some embodiments either avoid using in-place decryption or use a buffer that holds the multiple blocks, performs ECB-style decryption, then applies the initialization vectors to the multiple blocks together to generate the output blocks. For CTR encryption or decryption, the similarity of operations (i.e., the use of the same XOR operations and table lookups from one block to the next (at least during the initial rounds) allows for the re-use of the results of such operations across the multiple blocks, without the need to recompute the results.

In addition, for use in a whitebox environment, some embodiments apply various different whitebox techniques to the multi-block cryptographic operation. For instance, some embodiments will use a first whitebox technique (e.g., a mask value, a linear permutation operation, etc.) on a first one of the blocks and a second whitebox technique on a second one of the blocks. In addition, some embodiments modify the protection on the blocks between rounds of the cryptographic operation, possibly linking the blocks together, thereby further obfuscating the data at runtime.

In addition, the source code may be obfuscated in various ways in order to provide further protection against whitebox attackers. For instance, some embodiments mix the different rounds of the cryptographic operation for different blocks. Rather than performing round 1 for all of the multiple blocks, then round 2 for all of the blocks, etc., some embodiments mix up the rounds by, e.g., performing several rounds for one block, then a round or two for another block, etc., so long as all the dependencies between rounds are maintained.

Many more details of embodiments of the multi-block cryptographic operations will be discussed below. Section I first provides a detailed discussion of AES as an example of a multi-round block cipher operation. Section II then describes the multi-block cryptographic operation of some embodiments, and Section III describes various whitebox protections applicable to the multi-block cryptographic operation. Next, Section IV describes a content distribution environment in which the multi-block cryptographic operations might be used. Finally, Section V describes an electronic system with which some embodiments of the invention are implemented.

I. Description of AES

Before describing the multiple block cryptographic process of some embodiments in further detail, the example of AES will be described. While one of ordinary skill in the art will recognize that the principles described in this specification are applicable to various different forms of block cipher, they will be described in part by reference to the AES block cipher.

FIG. 1 provides a conceptual illustration of an example cryptographic operation 100 (e.g., an encryption or decryption operation) according to the AES standard. As shown in FIG. 1, input data 140 is processed in an initial round 110, nine middle rounds 120, and a final round 130, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

In some embodiments, AES has a fixed block size of 128 bits and a key size of 128, 192 or 256 bits. Due to the fixed block size of 128 bits, AES operates on a 4×4 array of bytes (e.g., 16 bytes). Accordingly, the input data 140 is a 16 byte array of information, which may be a sub-portion of a larger message. For instance, a three megabyte audio file can be divided into 16 byte portions and each portion encrypted according to operation 100. During the operations of AES, the input data 140, as manipulated, may be referred to as "AES state". AES state is a 16-byte buffer upon which the AES operations are performed.

AES uses key expansion, and like most block ciphers, a set of encryption and decryption rounds (iterations). Each round involves similar processes. As shown in FIG. 1, the initial round 110, nine middle rounds 120, and final round 130 each includes similar operations (e.g., SubBytes, ShiftRows, MixColumns, and AddRoundKey). The entire AES algorithm (e.g., operation 100) includes 11 AddRoundKey operations, 10 SubBytes operations, 10 ShiftRows operations, and 9 MixColumns operations. Preliminarily to operation 100, the original 16 byte cipher key 155 is expanded to 11 subkeys, during what is called a key scheduling operation. The 11 subkeys include subkey_0 160, subkey_1-subkey_9 165, and subkey_10 170. The eleven subkeys are each used in different rounds of operation 100. Each subkey is 16 bytes long, in some embodiments, to match the size of the AES state.

In the initial round 110, the cryptographic operation 100 receives input data 140 and performs AddRoundKey operation 115. The AddRoundKey operation 115 combines input data 140 with the subkey_0 155. Specifically, this operation 115 performs a logical exclusive disjunction operation (hereinafter "XOR") on subkey_0 155 and input data 140, in order to produce intermediate AES state.

Following the initial round 110, operation 100 performs nine middle rounds 120. Each of the nine middle rounds 120 include four operations: SubBytes 121, ShiftRows 122, MixColumns 123, and AddRoundKey 124. The SubBytes operation 121 substitutes the bytes of the current AES state according to a substitution table. This substitution table is sometimes referred to as a substitution box or "SBOX" table. This operation provides non-linearity in the cipher.

The ShiftRows operation 122 cyclically shifts bytes in each row of the AES state by certain offsets. As the AES state is a 4×4 16 byte array, the AES state can be arranged in a 4 row, 4 column arrangement. ShiftRows 122 will shift different rows of the 4×4 AES state by different amounts. For instance, in some embodiments, the first row is left unchanged, each byte of the second row is shifted one to the left, and the third and fourth rows are shifted by offsets of two and three respectively.

The MixColumns operation 123 combines bytes of the AES state from each column using an invertible linear transformation. The MixColumns operation 123 takes four bytes as input and outputs four bytes, where each input byte affects all four output bytes. The MixColumns operation may be implemented via a table lookup operation. Together with the ShiftRows operation, the MixColumns operation provides diffusion in the cipher.

The AddRoundKey operation 124 combines a round key from one of subkey_1-subkey_9 165 with the AES state, depending on the round, in the same manner as the AddRoundKey operation 115. For each round, a subkey is derived from cipher key 155. Each subkey is the same size as the AES state (e.g., a 4×4 16 byte array). The subkey is combined with the AES state using an XOR operation.

The cryptographic operation 100 performs nine such rounds on the AES state. Once the nine middle rounds 120 are completed, the operation 100 performs a final round 130, which includes a SubBytes operation 131, a ShiftRows operation 132, and an AddRoundKey operation 133. These final operations are the same as those described above in connection with the earlier rounds. The eleventh subkey_10 170 is combined with the AES state to produce output state 150.

The previous description of operation 100 corresponds to the order of operations required to encrypt content. Decryptions operations under AES are substantially similar, but the order of operations is reversed and inverses of the operations are used. The inverse of AddRoundKey is AddRoundKey itself. The inverse of SubBytes is Inverse SubBytes, which is another table look up operation. The inverse of MixColumns is Inverse MixColumns, which is also another lookup operation. The inverse of ShiftRows is Inverse ShiftRows, which is another move from one byte location to another. Different versions of AES (e.g., the 256-bit variant) can include different numbers of rounds and different key sizes. For further detail on AES, see the specification for the ADVANCED ENCRYPTION STANDARD (AES), NIST, http://csrc.nist.gov/publications/fips/fips197/fips$^{-1}$97.pdf.

II. Multi-Block Cryptographic Process

The above describes the standard, most basic form of AES, and other block ciphers follow similar types of processes. In a non-whitebox environment (e.g., on a secure server to which the public does not have access), the basic form of AES can generally be used without too much concern. However, in a whitebox environment (e.g., on a user device, the memory of which can be examined during the cryptographic process by a sophisticated user), additional protections to obfuscate the cryptographic process are often desired.

Accordingly, some embodiments use a process that encrypts or decrypts multiple blocks together as part of a single cryptographic operation, rather than performing the standard block cipher operation on one block at a time. For example, in the case of AES, several 16-byte blocks of a message may be encrypted or decrypted at once, in some embodiments. However, the concept could also be applied to other block ciphers, such as DES, 3DES, etc.

Figure 2:
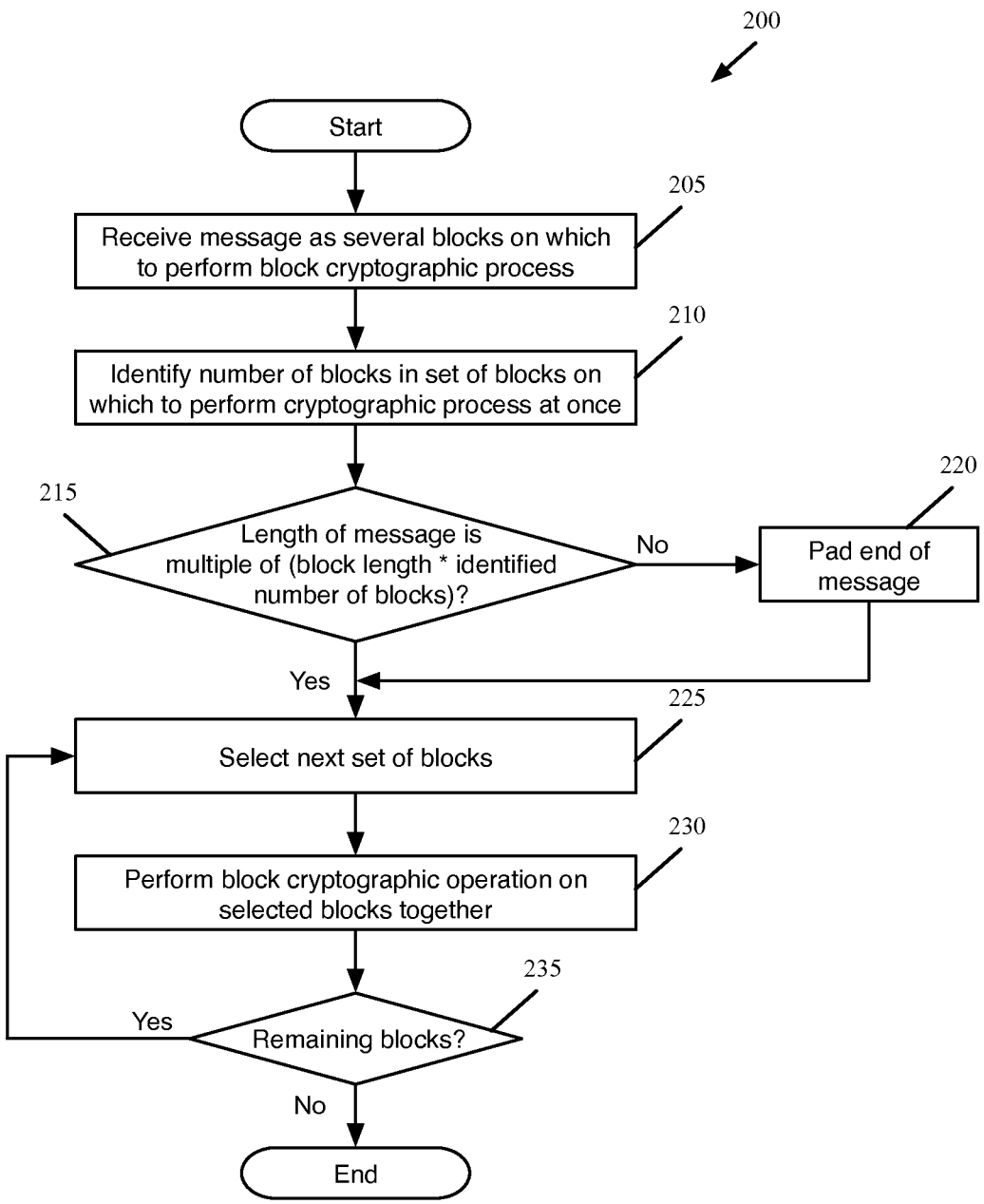
FIG. 2 conceptually illustrates a process 200 of some embodiments for performing a block cryptographic process on multiple blocks at once.

FIG. 2 conceptually illustrates a process 200 of some embodiments for performing a block cryptographic process on multiple blocks at once. In different embodiments, the process 200 may be performed by a software process executed by a set of general purpose processing units (e.g., a device central processing unit (CPU)) or a hardware process executed by a specialized encryption/decryption processor, such as an application-specific integrated circuit (ASIC) or field-programmable gate array (FPGA).

As shown, the process 200 begins (at 205) by receiving a message as several blocks on which to perform a block cryptographic process (e.g., AES, DES, 3DES, etc.). In some embodiments, the message might be media content (e.g., an audio file, video file, etc.), a file or other content for transmission, or any string of values encoded as bits. The block cryptographic process may be encryption or decryption. For instance, a server encoding plaintext (a generic term referring to unencrypted data) would perform a block encryption process, while a client device decrypting ciphertext (encrypted data) would perform a block decryption process. In many block ciphers, the encryption and decryption processes are very similar.

The process 200 then identifies (at 210) a number of blocks in a set of blocks on which to perform the cryptographic process together. In some embodiments, this number is set by the code that defines the cryptographic process. In the most basic form of most block ciphers, the number is 1, as each block is encrypted or decrypted separately. That is, the pseudocode for a typical block cipher looks like the following:

```
for (i=0 to nbBlock-1)
do
        EnDecryptBlock(InputBlock[i])
done
```

In this pseudocode, nbBlock is the number of blocks in the message (defined as nbBlock=InputLen/BlockLen, with InputLen being the length of the message and BlockLen being the length of a block), and EnDecryptBlock is the block cipher operation that takes one block at a time as input. As described below, the length of the message should be a multiple of the block length, and padding of the message with random bits may be used when this is not the case. The block length for AES is 16 bytes, and for DES or 3DES the block length is 8 bytes.

Instead, some embodiments use a block cipher operation for which the pseudocode is as follows:

```
for (i=0 to nbLoop-1)
do
    EnDecryptSeveralBlocks(InputBlock[NS*i], InputBlock[NS*i + 1],
        ...,
    InputBlock[NS*i + (NS-1)])
done
```

In this case, NS is the number of blocks in the set of blocks to which the block cipher is applied in parallel, and NBLoop (the number of times the block cipher operation will be called) is defined as InputLen/(BlockLen*NS). Some of the examples below will be described for the case in which the number of blocks in the set of blocks is two, in order to simplify the discussion of these examples. However, the inventive concepts described also apply to larger numbers of blocks that are encrypted or decrypted together.

After determining the number of blocks to be encrypted or decrypted together, the process 200 determines (at 215) whether the length of the message is a multiple of the product of the block length and that identified number of blocks. That is, using the variables above, whether InputLen is a multiple of (BlockLen*NS). If this is the case, then NBLoop will be an integer with no remainder.

If, however, the input length is not a multiple of the product of block length and the number of blocks per cipher operation, then the process pads (at 220) the end of the message in some embodiments such that, with the padding, the input length is a multiple of the block length multiplied by the number of blocks per operation. Some embodiments use random bytes to pad the message.

After ensuring that the message (with any needed padding bytes) is of the appropriate length, the process can enter the encryption/decryption loop. As shown, the process 200 selects (at 225) a next set of blocks. This is the set of blocks InputBlock[NS*i], InputBlock[NS*i+1], . . . , InputBlock[NS*i+(NS−1) in the pseudocode above, where i is the time through the block cryptographic process. The process then performs (at 230) the block cryptographic operation on the selected set of blocks together (i.e., the EnDecryptSeveralBlocks function shown in the pseudocode above). The details of this operation will be described in further detail below. Whereas a typical single-block cipher operation will have a code size of SZ, the multiple-block cipher operation of some embodiments will typically have a code size nearing NS*SZ, as all of the rounds for all of the blocks will have to be implemented in the code (i.e., the function EnDecryptSeveralBlocks). However, given the security and other benefits, code size is not an expensive commodity.

Finally, the process 200 determines (at 235) whether additional blocks remain (i.e., whether the multi-block cryptographic operation has been run NBLoop times). If additional blocks remain, the process returns to 225 to select the next set of blocks for the cryptographic operation. If all of the blocks have been encrypted or decrypted, the process ends.

The actual multi-block cipher operation may be different in different modes. Different embodiments may implement a block cipher operation in electronic codebook (ECB), cipher-block chaining (CBC), and counter (CTR) modes, among others. These three modes will be discussed here in greater detail, though many of the features described herein are applicable to other modes as well. In ECB, each block is encrypted or decrypted independently. In CBC, each block is dependent on the previous block with an initialization vector (IV) used for the first block. In CTR, a seed (referred to as a nonce) is used as the input to the cipher, with the output XORed with the block; the seed is incremented for each subsequent block. The following discusses the use of multi-block cipher operations for each of these different modes.

A. ECB Mode

ECB mode is the simplest of these modes with respect to multi-block encryption or decryption. In ECB mode, each plaintext block is encrypted independently, and therefore each ciphertext block is decrypted independently. That is, neither the input nor the output to a block cipher operation of one block affects the block cipher operation of any other blocks. The key is generally the same for each block (which is the case in all of the modes, in that one key is typically used for all blocks).

As such, encrypting or decrypting multiple blocks as part of a single function can be done without constraints (other than the code size). Specifically, the multi-block cipher operation would include all of the rounds for each of the several blocks. As described in the subsequent Section III, in some embodiments the different rounds of the cipher operations for the multiple blocks may be intertwined in order to improve the whitebox protections. Because there is no dependency between blocks, so long as the rounds for each block separately progress in order, then the rounds for the different blocks themselves may be intertwined.

B. CBC Mode

CBC mode, as briefly mentioned above, involves the use of an initialization vector for the cipher operation of the first block and the use of the previous block for the cipher operation of subsequent blocks. FIGS. 3A and 3B conceptually illustrate the CBC mode encryption and decryption processes. Specifically, FIG. 3A conceptually illustrates the CBC mode encryption process for the first three blocks of a message input to a block encryption process (e.g., AES, DES, 3DES, etc.).

As shown, a first block 305 is combined with an IV 310 (e.g., via an XOR operation) before being input to the block encryption process 300. The block encryption process 300 thus applies its operations (e.g., the 11 rounds of AES encryption) to an input block that is different from the actual data being encrypted (based on the use of the IV 310), using a key 315. This generates a first ciphertext block 320.

In addition to being the output data for the first block 305, the first ciphertext block 320 is combined with the second input block 325 in the same manner that the IV 310 was combined with the first input block 305 (e.g., via an XOR operation). For each subsequent block, the ciphertext output of the previous block is combined with the input block before inputting the block to the block encryption process 300.

FIG. 3B conceptually illustrates the CBC mode decryption process. For decryption, the initialization vector is combined with the output of the block decryption process 350, rather than with the input (as the decryption process reverse the encryption process). Thus, as shown, a first input block 320 (i.e., the ciphertext version of the first block) is input into the block decryption process 350 (e.g., the 11 rounds of AES decryption), and the output of this process is combined with the IV 310 to regenerate the plaintext block 305. In this case, the input block 320 (the ciphertext block) is combined (e.g., via an XOR operation) with the output of the block decryption process 350 for the second block, and similarly for each subsequent block.

As a result of the nature of CBC mode encryption and decryption, the multiple-block cipher operation provides very little benefit on the encryption side. This is because the entire encryption process for each block N must be completed before the encryption process for block N+1 can begin, as the input block N+1 will be combined with the output for block N before applying the encryption operations. As such, each block will be encrypted in series, preventing any ability to mix the rounds of different blocks together.

For decryption, on the other hand, the input for a first block is combined with the output for a subsequent block. As such, the decryption of a block N need not be complete before beginning the decryption of the block N+1. The one limitation for CBC mode decryption is that in-place decryption cannot be used. In-place decryption refers to the process in memory of continuously overwriting the input state during the decryption process. For example, the first ciphertext block 320 would be stored in memory as the input to the block decryption process 350. As the decryption process applies its operations (e.g., the various AddRoundKey, Sub-Blocks, MixColumns, and ShiftRows operations of AES), this value would be continuously overwritten in memory when using in-place decryption. However, because the first ciphertext block 320 is combined with the output of the decryption process for the second block, the first ciphertext block 320 will be needed once the second block decryption process is complete, and therefore cannot be overwritten.

However, when not having in-place decryption is a problem, some embodiments use a buffer having a size that is a multiple of the product of the block length and the number of blocks encrypted or decrypted together. That is, the buffer has a size of BlockLen*NS*X, for a given small X. Some embodiments decrypt the blocks in the buffer (i.e., the NS*X blocks, which may require several multi-block decryption functions), then apply the IV (both the actual IV 310 and the input ciphertext blocks that are combined with the output blocks). At this point, the output for these blocks has been generated, and only the last block length of the input is needed for the next set (i.e., the input for the last of the NS*X blocks will be needed for combination with the output of the first block in the subsequent NS*X blocks. This uses an overhead in memory (e.g., RAM) of BlockLen*NS*X bytes and enables the application of mostly in-place decryption to multi-block CBC mode decryption, with the limitation that all of the data will not be decrypted at the same time.

As pseudocode, the CBC mode decryption is as follows:

```
for (each set of blocks of size BlockLen*NS*X)
    Decrypt as though using ECB, with multi-block technique
    Store result in Temp[ ], another buffer of size BlockLen*NS*X
    Apply the IV including input blocks) to Temp[ ]
    Store Temp[ ] in Output, and go to next block of size
        BlockLen*NS*X
```

That is, each set of blocks NS*X will have X multi-block decryption functions applied, using ECB-type decryption (individual decryption of the blocks), which allows for various mixing of the blocks decrypted together. These decrypted blocks are then combined with the IV (for the first block) or the input ciphertext of the previous block (for all subsequent blocks).

C. CTR Mode

CTR mode, as briefly mentioned above, uses a nonce as the input to the block encryption/decryption process, and combining this output with an input block to generate an output block. The nonce is then modified in some way (typically by incrementing) for each subsequent block. Because the nonce, and not the input block itself (or a modified input block) is input to the block cipher process, some embodiments use the same set of block cipher operations for both encryption and decryption. For instance, with AES, the encryption operations (as shown in FIG. 1) are applied to the nonce for both the encryption and decryption processes.

Figure 4:
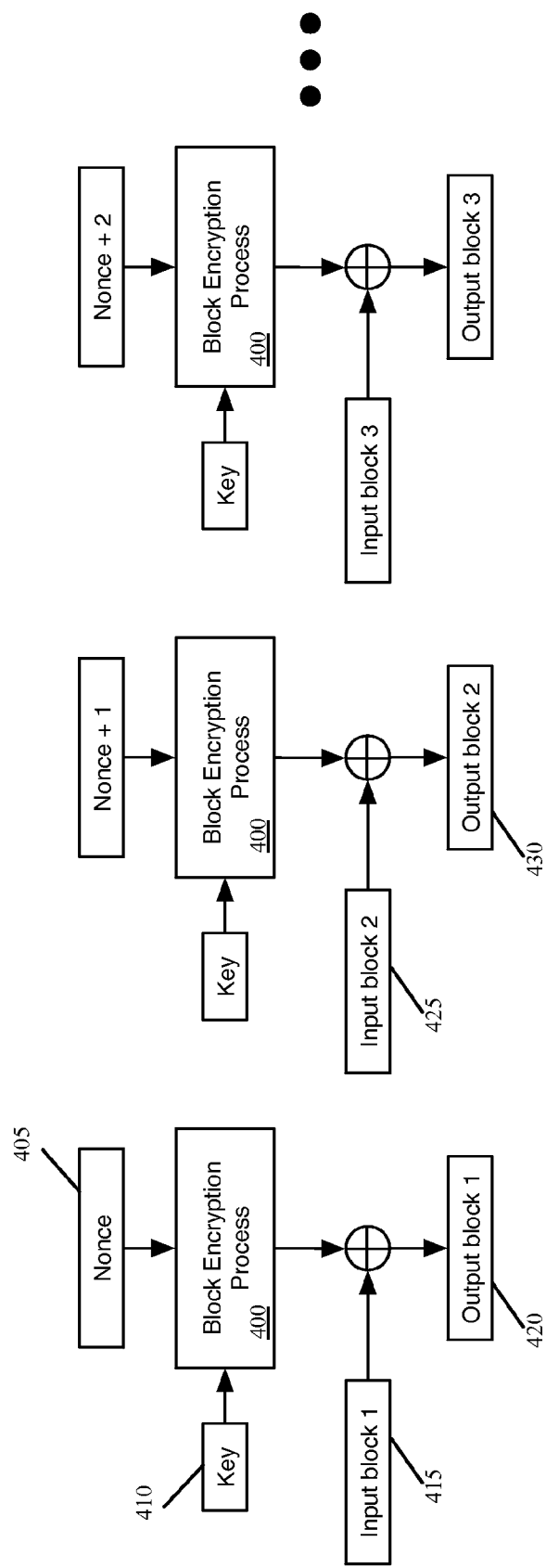
FIG. 4 conceptually illustrates the CTR mode encryption and decryption process.

FIG. 4 conceptually illustrates the CTR mode encryption and decryption process. As shown, for the first block, a nonce 405 is used as input (along with a key 410) to the block encryption process 400. In some embodiments, the nonce is the same size as the input blocks (e.g., 16 bytes for AES). Some embodiments use a random 16 byte value, while other embodiments use, e.g., a random 8 byte value followed by an 8 byte counter that starts at 0 (i.e., a 64-bit random value followed by 64 bits of 0 s). The output of the block encryption process 400 will be a value having the same size as the input block 415, which is then combined with the encrypted nonce to get the output block 420 (e.g., using an XOR operation).

For the second block 425, the nonce is incremented before being input to the block encryption process 400, which results in a different value to be combined with the second input block 425 in order to generate the second output block 430. Different embodiments may use different techniques for incrementing the nonce. Standardized techniques for incrementation are described in http://csrc.nist.gov/publications/nistpubs/800-38a/sp800-38a.pdf, which is incorporated herein by reference.

The nonce 405 and the same nonce incremented by one will have numerous bytes in common. In fact, for a 128-bit nonce (the size for standard AES), up to 127 of the bits will be the same. In the case of multi-block cryptographic operations in CTR mode, as the block cipher is applied to the nonces rather than the input blocks, many of the computations from one block to the next will be very similar. Some embodiments, therefore, share computations between blocks and therefore are able to save both binary size (i.e., fewer operations need to be in the object code) and computation time.

For AES, the block cipher is typically implemented using 16 table look ups (TLUs) and 16 XOR operations per round, for ten rounds. This means that there are a total of 160 TLUS and 160 XORs for an AES block cipher. If the increment operation for the nonce only modifies one byte (meaning that the least significant byte of the nonce was less than 255), only one of the 16 TLUs in the first AES round will differ between the initial nonce and the incremented nonce. Thus, 15 TLUs and 15 XORs need not be recomputed for the second block. In the second round, 12 TLUs and 12 XORs need not be recomputed for the second block. In total, 27 TLUs and 27 XOR operations need not be recomputed, meaning that 266 such computations are performed rather than 320 for approximately 17% savings.

Figure 5:
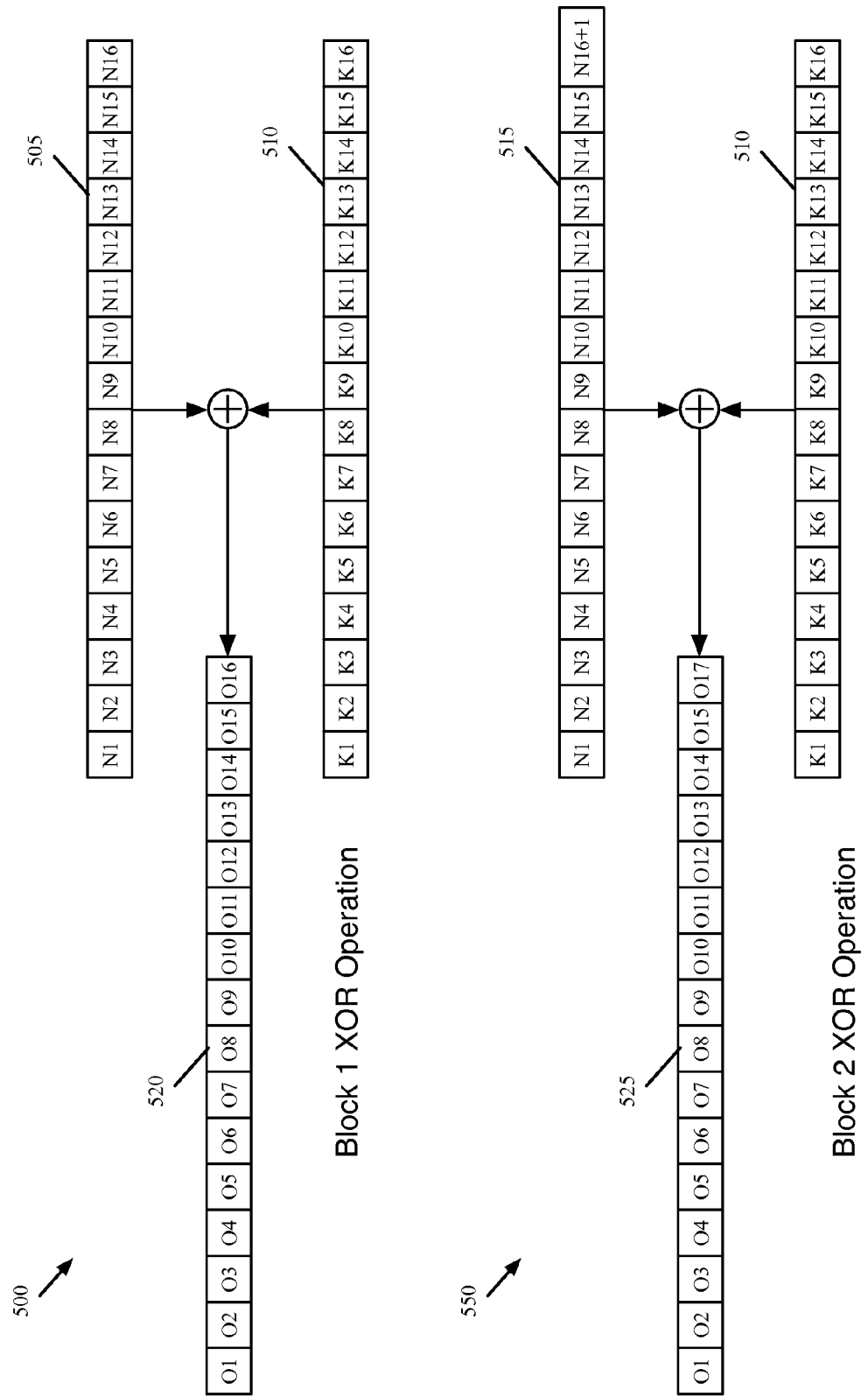
FIG. 5 conceptually illustrates a first XOR operation between a nonce having 16 bytes N1-N16 and a key having 16 bytes K1-K16 and a second XOR operation between an incremented nonce having 16 bytes N1-N15 and N16+1 and the key.

FIG. 5 conceptually illustrates this principle in the case of a first XOR operation 500 between a nonce 505 having 16 bytes N1-N16 and a key 510 having 16 bytes K1-K16 and a second XOR operation 550 between an incremented nonce 515 having 16 bytes N1-N15 and N16+1 and the key 510. As shown, the first XOR operation 500 generates an output 520 and the second XOR operation 550 generates an output 525. The first 15 bytes of the output 525 and the output 520 are the same; only the last byte differs between the two outputs. As such, from one block to the next, only the XOR operation for the last byte needs to be recomputed.

The principle can be generalized to performing the block cryptographic operation on more than two blocks together as well. Assuming that NS blocks are encrypted or decrypted together, and the nonces only differ by one byte within those NS blocks, (NS−1)*27 TLU operations and (NS−1)*27 XOR operations can be avoided. This asymptotes to a 17% improvement for the binary size and the computational time compared with the multiple-block cryptographic operation in ECB or CBC modes (or the computational time for a typical one-block cryptographic operation).

However, as a general statement, there is no guarantee that all of the nonces for a group of NS blocks will differ by only one byte. To ensure this is the case, NS may be chosen as a power of 2 up to 256 (i.e., 2, 4, 8, 16, 32, 64, or 128). In this case, so long as the least significant byte of the nonce is 0 for the first block, then all of the nonces for the multiple block encryption or decryption operation will only differ by one byte and the computation-saving mechanisms can be applied.

III. Application of Whitebox Techniques

In addition to providing minimal speed cost (or, potentially, computation speed benefits, in the case of CTR mode), the multi-block cryptographic operation of some embodiments also enables a diversity of whitebox protection for different blocks, or even for different rounds of a single block. In a whitebox environment, such as a client user device, the memory is accessible to a hacker during the encryption. Accordingly, if no whitebox protections are used, a sophisticated hacker can generally figure out the key by isolating the rounds of the block cipher and observing the key and state data in memory during decryption.

As such, even in standard AES, various whitebox protection methods may be used. The goal of such methods is to change the presentation in memory of the AES state and/or the key. Some techniques may use a mask value applied to both the key and the input state (i.e., the input block). Another set of techniques involves applying a linear permutation to both the mask and the key, as described in U.S. Pat. No. 8,718,280, entitled "Securing Keys of a Cipher Using Properties of the Cipher Process", which is incorporated herein by reference. Such protection methods make things significantly more difficult for a hacker attempting to isolate the key on an insecure device.

Figure 6:
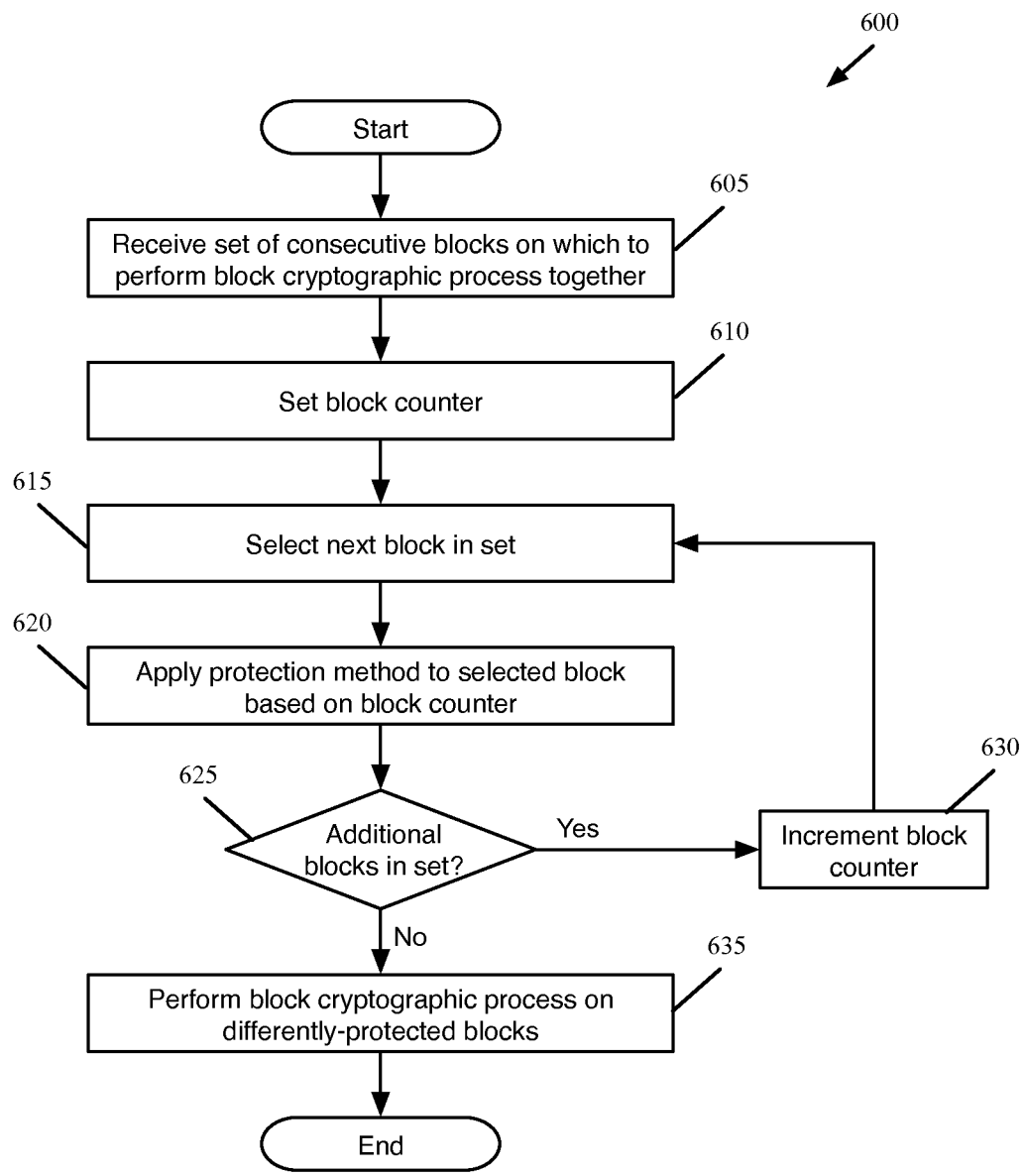
FIG. 6 conceptually illustrates a process of some embodiments to perform a multi-block cryptographic operation with differentiated protection methods.

When encrypting or decrypting several blocks at once, some embodiments use different whitebox methods for different blocks. At the simplest level, some embodiments apply a first obfuscation method to a first block in a set of blocks, a second obfuscation method to a second block in the set, etc., in order to make reverse engineering the code more complex. FIG. 6 conceptually illustrates a process of some embodiments to perform a multi-block cryptographic operation (e.g., AES) with differentiated protection methods.

As shown, the process 600 begins by receiving (at 605) a set of consecutive blocks of a message on which to perform a block cryptographic operation together. Referring to the discussion above in Section II, these are the NS blocks for the EnDecryptSeveralBlocks function. The block cryptographic operation could be either encryption or decryption, using AES, DES, 3DES, or another such method, and could be applied in ECB, CBC, CTR, or a different mode, in some embodiments.

The process 600 then sets (at 605) a block counter. In some embodiments, the same whitebox technique is applied to each block in a particular position in the NS blocks for each set of blocks. That is, in the first set of NS blocks, the second set of NS blocks, etc., the first block always receives a first whitebox protection, the second block always receives a second whitebox protection, etc. The block counter is used to identify which protection function should be applied to each block. One of ordinary skill in the art will recognize that the process 600 represents only one possible process for applying different whitebox method to different blocks, and many possible different processes are possible. The process 600 is merely a conceptual process, and therefore the actual implementation might use variants or a completely different method for applying the different whitebox protections.

Next, the process selects (at 615) the next block in the set of blocks. The process then applies (at 620) a protection method to the selected block based on the block counter. That is, as mentioned, the first block in each set receives a first particular protection method, the second block receives a second particular protection method. Some embodiments also apply the protection method to the key at this stage as well. While the key will typically be the same for each block, it may appear different in memory if different protections (e.g., different masks or linear permutations) are applied.

The process then determines (at 625) whether additional blocks remain in the set. Some embodiments determine whether the block counter has yet reached the number NS (or NS−1, if starting at 0). When additional blocks remain, the process increments (at 630) the block counter and returns to 615 to select the next block in the set.

Once the different protection methods have been applied to each block, the process performs (at 635) the block cryptographic process on the differently protected blocks together. That is, the function EnDecryptSeveralBlocks described above is performed, once the blocks have had the different whitebox protections applied. The process 600 then ends.

The application of different whitebox techniques to different blocks is a first-level technique to obfuscate the multi-block cryptographic operation. Some embodiments go further, and differentiate protections round-by-round. Because AES (as well as most other well-known block ciphers) are sequences of equivalent rounds, some embodiments use whitebox protections that switch from one protection method to another between rounds. In some embodiments, the switch may depend on random values generated during execution (e.g., using a random mask or random linear permutation). Thus, the whitebox method for each block may itself contain numerous different whitebox methods. The following provides an example:

Method1=Method11∥Method12∥ . . . ∥Method1$n$
Method2=Method21∥Method22∥ . . . ∥Method2$n$ In this case, M1∥M2 indicates that the encryption (or decryption) process applies M1 and then M2. Some embodiments design the Method11, . . . , Method2$n$ in such a way that the cryptographic process can easily switch from Method1$x$ to Method2$y$. For example, some embodiments use a dedicated function that transforms data from "type 1" (data managed by Method1$x$) into "type 2" (data managed by Method2$y$). This allows the two encryption or decryption whitebox methods to be interleaved, making it more difficult for an attacker to divide the data in memory into two independent methods.

Figure 7:
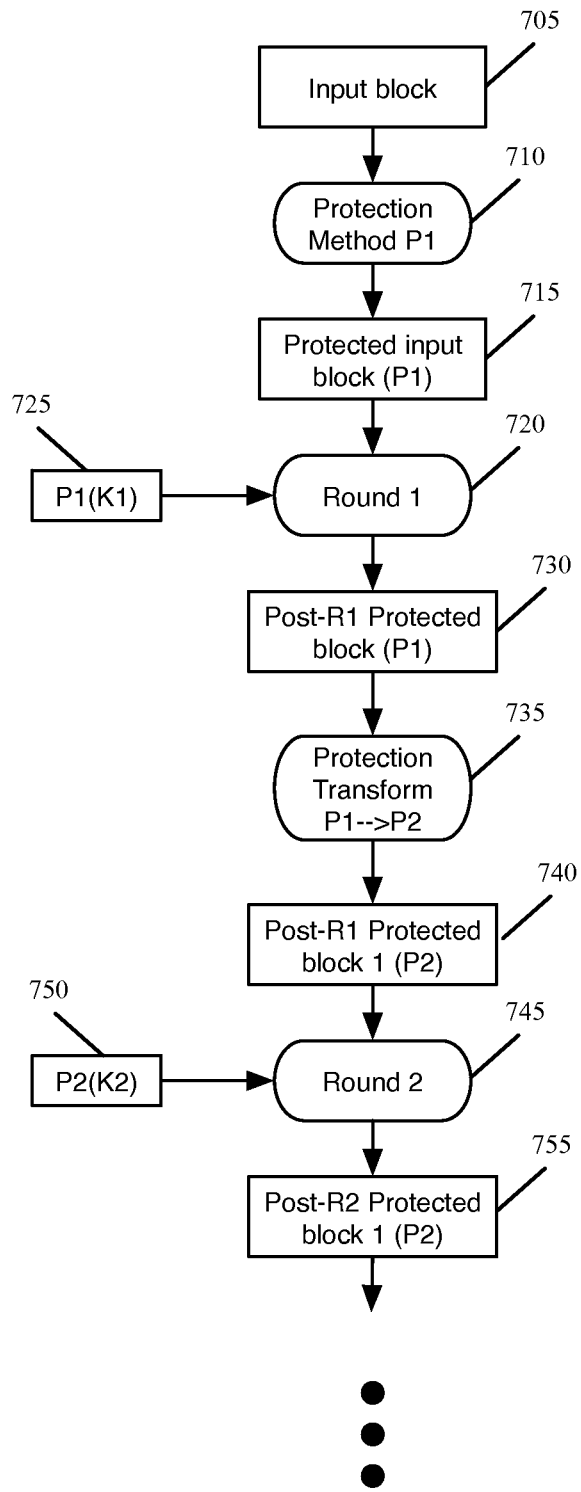
FIG. 7 conceptually illustrates the application of different protection methods to a block as it is passed through each round of a block cipher.

Using these principles, some embodiments modify the protection applied to the key and state (the input block as transformed up to that point) after each round, or between some of the rounds of the block cipher. FIG. 7 conceptually illustrates the application of these different protection methods to a block as it is passed through each round of a block cipher. As shown, the state begins as input block 705. Before beginning the application of the block cipher, a first whitebox protection method 710 is applied to the block to generate a new state 715, protected by P1. This protection method may involve the use of a linear permutation, a mask, etc.

Next, the first round 720 of the block cipher is applied to the protected input block 715. This round 720 uses a key 725 as input, which is also protected by the whitebox protection method P1. The output of the block is a new state 730, which is still protected by P1. One of ordinary skill in the art will note that, while shown as "Round 1", this may be the initial round of AES that uses subkey_0.

Next, before applying the second round of the block cipher, a whitebox protection transform P1→P2 735 is applied to the state 730, to generate a new current state 740. The state 740 is protected by P2 rather than P1. In some embodiments, the transform P1→P2 is designed such that the unprotected state is never exposed to an attacker (i.e., the transform does not first undo the P1 protections and then subsequently apply the P2 protections). With the protection transformed, the second round 745 of the block cipher is applied, using a second key 750 (i.e., a second subkey generated from the same cipher key as the first key 725). However, the second key 750 is protected with the whitebox protection P2, to match the protection applied to the current state. The application of the second round 745 results in a new state 755, still protected with P2.

For subsequent rounds, some embodiments use a protection transform to modify the whitebox protection applied between each round. On the other hand, some embodiments modify the whitebox protection on the state after several rounds, or even at random. Some embodiments require the same type of protection applied to each round for a particular block (e.g., using different linear permutations or different masks), while other embodiments vary the type of protection between rounds.

In addition, if the encryption or decryption of one block is independent from the encryption or decryption of the other blocks, obfuscation methods may be applied to the code, by mixing the rounds for different blocks together. That is, so long as dependencies are maintained in order, the code need not perform round 1 for all blocks in a set, then round 2 for all blocks in the set, etc. The lack of such dependencies is apparent in ECB mode, and in CTR mode so long as the rounds the computations of which will be reused are performed before they need to be reused, the rounds can be mixed without any loss of efficiency. CBC mode decryption, as described above, may be performed by using ECB mode (with any amount of round mixing) and then applying the IVs afterwards, so the round-mixing process may apply here as well.

In addition to mixing rounds, other aspects of code obfuscation may be employed as well, such as adding neutral code (i.e., code that does not affect the important data but serves to confuse an attacker), replacing portions of code with equivalent operations, and merging portions of code without affecting the operations of the code. This shuffle/fertilize/aggregate/neutral ("SFAN") concept is described in detail in U.S. Pat. No. 8,661,549, entitled "Method and Apparatus for Obfuscating Program Source Codes", which is incorporated herein by reference. Applying these techniques increases the difficulty for a hacker to differentiate which operations are the encryption/decryption of the first block from those of the second, third, etc. blocks. As operations on different blocks at different rounds are performed at the same time, in a complex manner, the multi-block cryptographic operation becomes very difficult to reverse. In some cases each block modifies how the other blocks are computed, creating many links between the blocks, adding to this difficulty.

Figure 8:
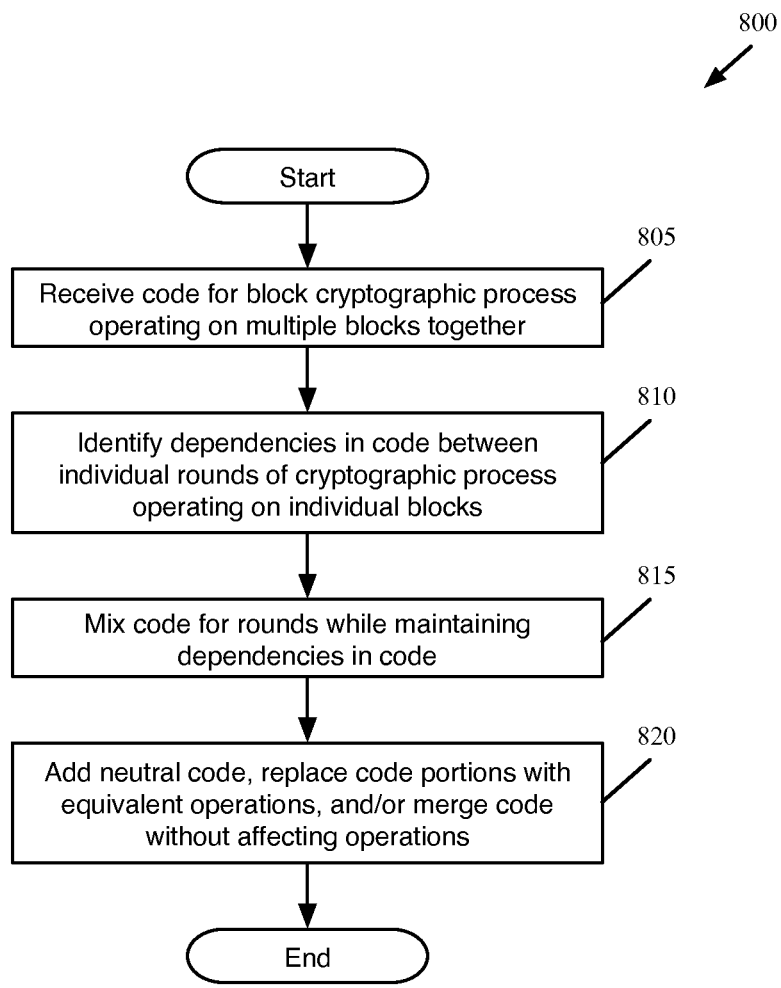
FIG. 8 conceptually illustrates a process of some embodiments for obfuscating a multi-block cryptographic operation.

FIG. 8 conceptually illustrates a process 800 of some embodiments for obfuscating a multi-block cryptographic operation. In some embodiments, the process 800 is performed on the source code, prior to compiling the code. This process may be performed by a source code obfuscation application, or module, on a computer, in some embodiments.

As shown, the process 800 receives (at 805) code for a block cryptographic operation that operates on multiple blocks together. This could be, e.g., the EnDecryptSeveralBlocks operation described above in Section I. In some embodiments, this is source code, that has not yet been compiled into object code.

The process next identifies (at 810) dependencies in the code between individual rounds of the cryptographic operation that operate on individual blocks. In some embodiments, these dependencies are simply that the block cryptographic operation for each individual block must have its rounds performed in order (i.e., that round N for a particular block must be performed before round N+1 for a particular block). In addition, some embodiments consider the protection transforms as operations for which dependencies must be determined.

The process 800 then mixes (at 815) the code for the different rounds while maintaining dependencies in the code. For example, the code might perform several of the rounds for one block, then a round or two for a different block, etc. An example of such mixing is described below by reference to FIG. 9.

In addition to mixing the code for the different rounds of different blocks, the process also adds (at 820) neutral code, replaces code portions with equivalent operations, and/or merges code portions without affecting the operations. For example, neutral code might be added that introduces 16-byte data into memory and manipulates the data, but is actually unrelated to the block cipher operation. The replacement of portions of code will result in the data in memory potentially being manipulated differently than one would expect for typical AES (or a different block cipher), but producing the correct end result. Merging code allows operations to be performed that skip steps, but again produce the correct end result. All of these obfuscations serve to make things more difficult for an attacker in a whitebox environment to identify what data in memory represents the AES state and/or key.

Figure 9:
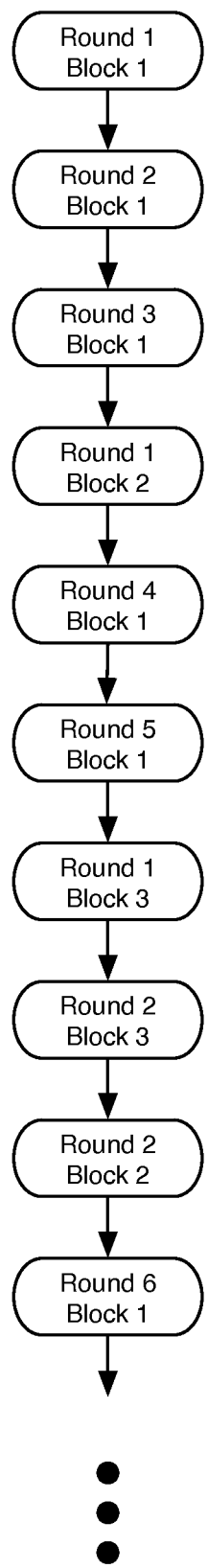
FIG. 9 conceptually illustrates the performance of several rounds of a block cipher for multiple blocks in which the rounds have been mixed together for obfuscation purposes.

FIG. 9 conceptually illustrates the performance of several rounds of a block cipher for multiple blocks in which the rounds have been mixed together for obfuscation purposes. In this example, the multi-block cipher performs operations on three blocks at once. As shown, the multi-block cipher operation begins by performing rounds 1-3 on the first block. The rounds for each individual block must be performed in order, as the AES state of round X is dependent on the state output by round X+1. After performing round 3 on block 1, the multi-block cipher then performs round 1 on block 2, subsequently returning to rounds 4 and 5 of block 1. At this point, the multi-block cipher begins performing its operations on block 3, performing both round 1 and round 2 on this block. Next, round 2 on block 2 is performed, followed by round 6. This illustrates that (i) not all of the rounds for one block need to be performed subsequently, (ii) not all of the round X operations for each block need to be performed subsequently, and (iii) round X for block N may be performed before round X for block N−1. While this figure does not show the protection functions and protection transforms, some embodiments treat these as part of the operations of a round, while in other embodiments the protection operations can be mixed together between rounds as well.

IV. Content Protection Environment

The above-described multi-block cryptographic operation and associated whitebox techniques may be performed, in some embodiments, in the context of a content distribution environment (e.g., a content distribution scheme for distributing audio, video, and other media, as well as for software and software updates).

Figure 10:
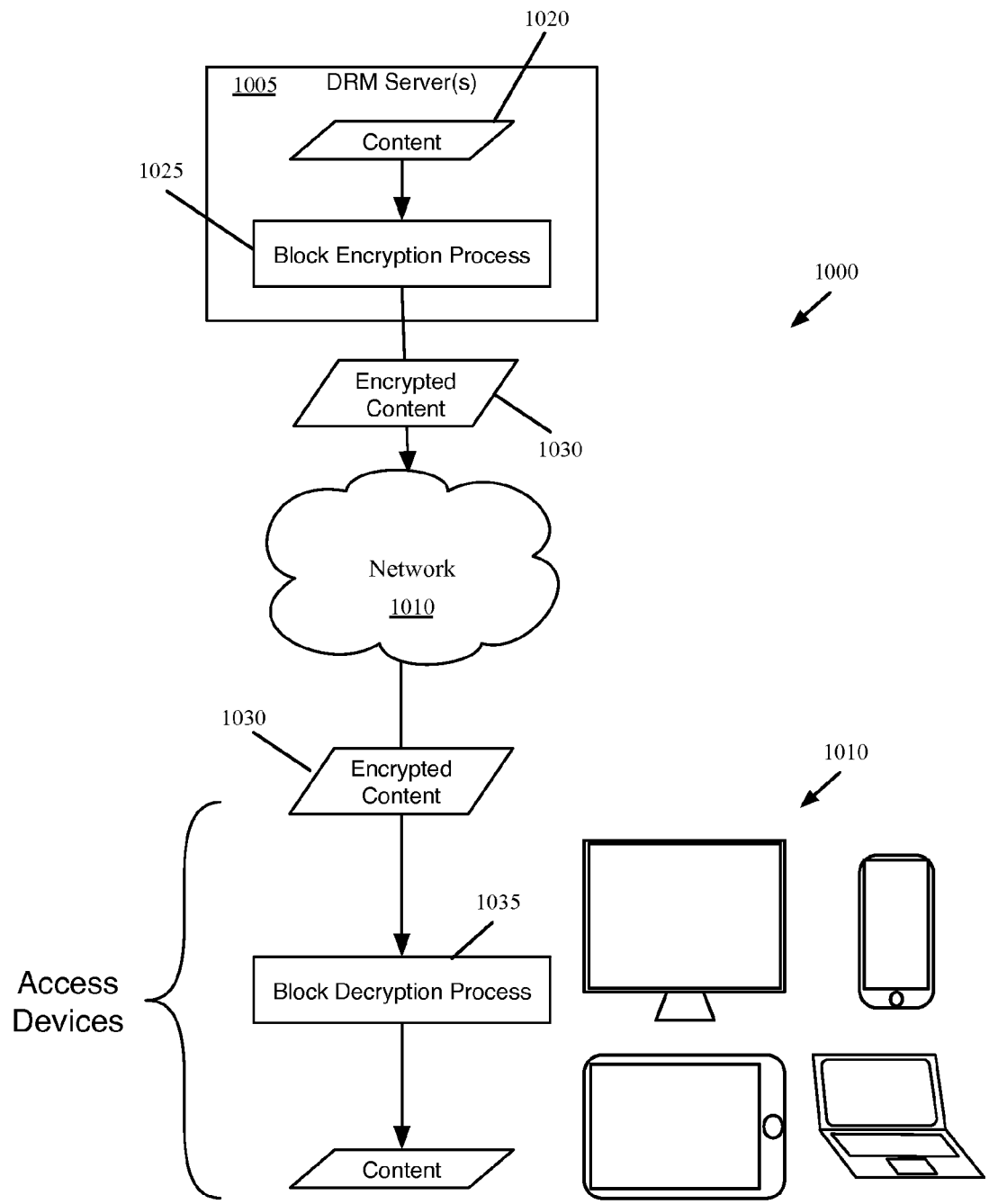
FIG. 10 conceptually illustrates a simplified view of a content distribution scheme that uses block encryption and decryption operations.

FIG. 10 conceptually illustrates a simplified view of such a distribution scheme 1000 that uses block encryption and decryption operations. As shown, the distribution scheme 1000 includes a set of DRM servers 1005 and a set of access devices 1010. These sets of devices are connected via a network 1015. Though not shown in this figure, some embodiments use a cloud storage that allows users to store data in a network storage for access by multiple of the devices 1010.

As shown in the figure, content 1020 is encrypted at the servers 1005 using a block encryption process 1025. In some embodiments, because this is a protected environment (i.e., not a whitebox environment), standard encryption techniques (e.g., the AES process shown in FIG. 1) are used. Other embodiments use multi-block encryption or decryption on the servers 1005. The content encrypted may be any type of digital content, including but not limited to audio (e.g., music, podcasts, etc.), video (e.g., movies, TV show episodes, music videos, etc.), other media content (e.g., images, text such as e-books, etc.), software (e.g., applications, application updates, firmware updates, etc.), or any other type of digital content. The result of applying the block encryption process 1025 is encrypted content 1030, which can be transmitted through the network 1015 to one or more access devices. Some embodiments encrypt the content differently for different users (e.g., using different keys, different encryption techniques, etc.), and thus each time the content is encrypted it is encrypted for a particular user (who may, in some embodiments, access the content on different access devices 1010).

One or more of the access devices 1010 receives the encrypted content 1030, and performs a block decryption process 1035 to decrypt the content, thereby enabling access to the content (e.g., playing back media, installing software, etc.). The access devices may include various different types of devices, including desktop computers, laptop computers, smart phones, tablets, media players, etc. The block decryption process 1035 on the access devices provides the more significant benefits for application of multi-block cryptographic operations (decryption, specifically, in this case) and the various whitebox techniques. Because these devices may be used and therefore inspected by individual users, the obfuscation mechanisms described herein are especially useful on the access devices 1010.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
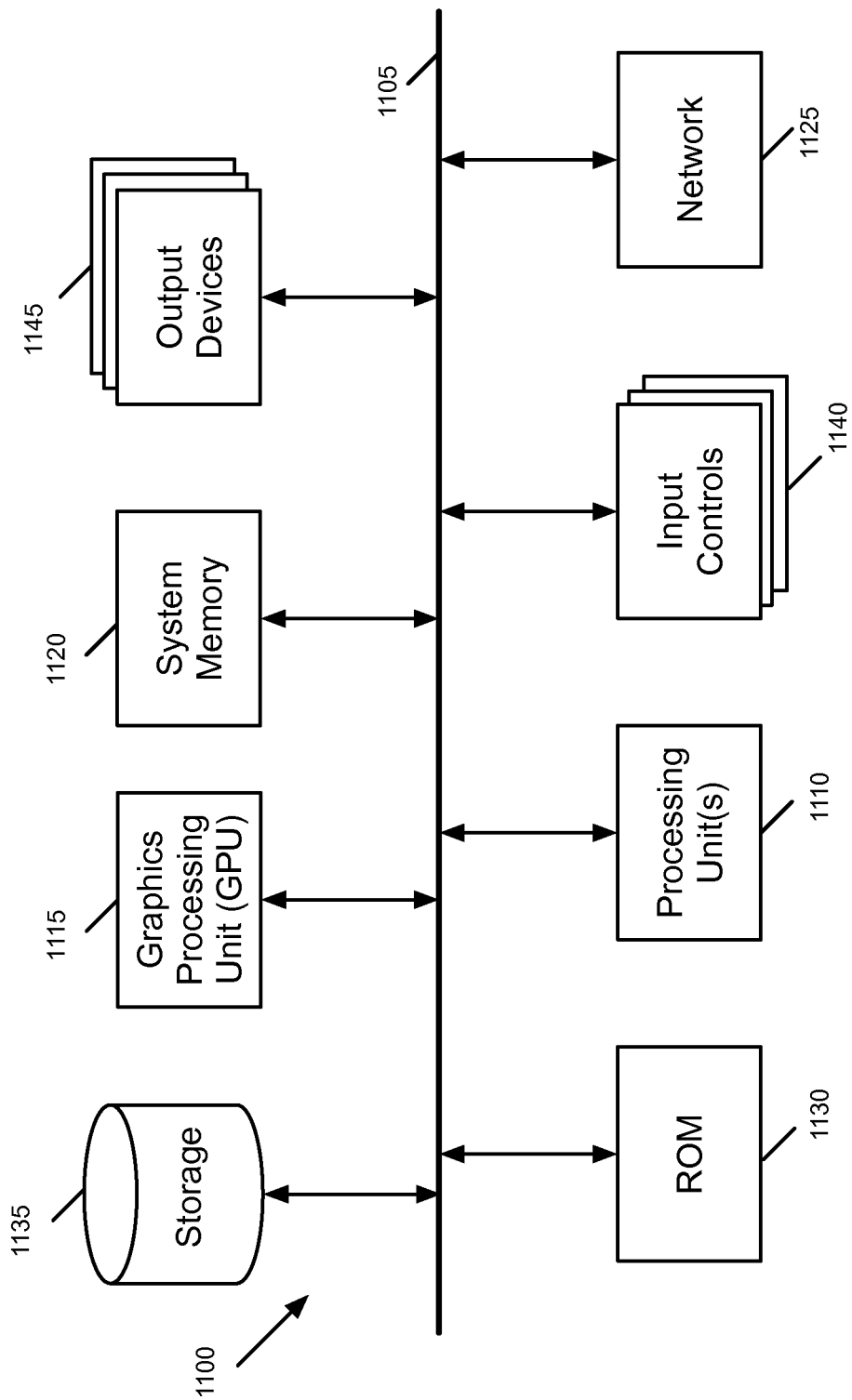
FIG. 11 conceptually illustrates an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet), or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for performing a block cryptographic operation comprising a plurality of rounds, the method comprising:
  receiving a message comprising a plurality of blocks;
  identifying a set of round-specific keys for use in a cryptographic operation to apply to the message;
  selecting a set of the blocks, the set having a particular number of blocks of the message; and
  in order to increase protection against whitebox attackers attempting to access the message, applying the cryptographic operation, using the identified set of keys, to the selected set of blocks, wherein a first particular round of the cryptographic operation for a first block of the message in the set is performed using a first round-specific key after a later round than the first particular round is performed using the first round-specific key for a second block of the message in the set, and a second particular round for the first block is performed using a second round-specific key before an earlier round than the second particular round for the second block is performed using the second round-specific key.

2. The method of claim 1, wherein the message comprises one of audio content, video content, and software.

3. The method of claim 1, wherein at least two rounds for the first block are performed one after the other without any intervening rounds for any other blocks in the set.

4. The method of claim 1, wherein the rounds of the cryptographic operation for the different blocks in the set are mixed while maintaining dependencies between the rounds and blocks.

5. The method of claim 1, wherein the cryptographic operation is decryption, and is applied using one of ECB, CBC, and CTR modes.

6. The method of claim 1, wherein the cryptographic operation is encryption, and is applied using one of ECB and CTR modes.

7. The method of claim 1, wherein the cryptographic operation is applied using CTR mode, wherein results of several sub-operations applied to the first block in the set are re-used for the second block in the set without re-applying the sub-operations to the second block.

8. The method of claim 7, wherein the several sub-operations comprise exclusive OR (XOR) operations and table lookup (TLU) operations.

9. The method of claim 1, wherein the application of the cryptographic operation to different blocks in the set of blocks uses different protection techniques for the different blocks.

10. The method of claim 1, wherein different rounds of the cryptographic operation for different blocks in the set are protected using different protection techniques.

11. The method of claim 10, wherein the first round for a particular block in the set of blocks is protected using a different protection technique than the second round for the particular block.

12. The method of claim 11, wherein applying the cryptographic operation comprises:
protecting the particular block with a first protection technique to generate a first state that is protected with the first protection technique;
applying the first round of the cryptographic operation to the first state to generate a second state that is protected with the first protection technique;
applying a protection transform to the second state to generate a third state that is protected with a second protection technique; and
applying the second round of the cryptographic operation to the third state to generate a fourth state that is protected with the second protection technique.

13. The method of claim 12, wherein the first round uses the first round-specific key protected with the first protection technique and the second round uses the second round-specific key protected with the second protection technique.

14. The method of claim 10, wherein the different protection techniques for different particular rounds comprise different linear permutations applied to both the block and the round-specific key used for the particular round.

15. The method of claim 10, wherein the different protection techniques for different particular rounds comprise different mask values applied to both the block and the round-specific key used for the particular round.

16. The method of claim 10, wherein the different protection techniques comprise at least one linear permutation and at least one mask value.

17. The method of claim 1, wherein the set of blocks is a first set of blocks, wherein the method further comprises, after applying the cryptographic operation to the first set of blocks:
selecting a second set of the blocks, the second set having the same particular number of blocks; and
applying the cryptographic operation, using the identified set of round-specific keys, to the second set of blocks.

18. A non-transitory machine readable medium storing a program which when executed by at least one processing unit performs a block cryptographic operation comprising a plurality of rounds, the program comprising sets of instructions for:
receiving a message comprising a plurality of blocks;
identifying a set of round-specific keys for use in a cryptographic operation to apply to the message;
selecting a set of the blocks, the set having a particular number of blocks of the message; and
in order to increase protection against whitebox attackers attempting to access the message, applying the cryptographic operation, using the identified set of keys, to the selected set of blocks, wherein a first particular round of the cryptographic operation for a first block of the message in the set is performed using a first round-specific key after a later round than the first particular round is performed using the first round-specific key for a second block of the message in the set, and a second particular round for the first block is performed using a second round-specific key before an earlier round than the second particular round for the second block is performed using the second round-specific key.

19. The non-transitory machine readable medium of claim 18, wherein at least two rounds for the first block are performed one after the other without any intervening rounds for any other blocks in the set.

20. The non-transitory machine readable medium of claim 18, wherein the rounds of the cryptographic operation for the different blocks in the set are mixed while maintaining dependencies between the rounds and the blocks.

21. A device comprising:
a set of processing units; and
a non-transitory machine readable medium storing a program which when executed by at least one of the processing units performs a block cryptographic operation comprising a plurality of rounds, the program comprising sets of instructions for:
receiving a message comprising a plurality of blocks;
identifying a set of round-specific keys for use in a cryptographic operation to apply to the message;
selecting a set of the blocks, the set having a particular number of blocks of the message; and
in order to increase protection against whitebox attackers attempting to access the message, applying the cryptographic operation, using the identified set of keys, to the selected set of blocks, wherein a particular round of the cryptographic operation for a first block of the message in the set is performed using a first round-specific key after a later round than the particular round is performed using a second round-specific key for a second block in the set.

22. The device of claim 21, wherein a first round for a particular block in the set of blocks is protected using a different protection technique than a second round for the particular block.

23. The device of claim 22, wherein the set of instructions for applying the cryptographic operation comprises sets of instructions for:
protecting the particular block with a first protection technique to generate a first state that is protected with the first protection technique;
applying the first round of the cryptographic operation to the first state to generate a second state that is protected with the first protection technique;
applying a protection transform to the second state to generate a third state that is protected with a second protection technique; and
applying the second round of the cryptographic operation to the third state to generate a fourth state that is protected with the second protection technique.

* * * * *